United States Patent [19]
Ring et al.

[11] 3,823,650
[45] July 16, 1974

[54] DESTROKING OF HYDROSTATIC DRIVE MOTORS

[75] Inventors: Curtis Phillip Ring; Billie Gene Hunck, both of Cedar Falls, Iowa

[73] Assignee: Deere & Company, Moline, Ill.

[22] Filed: Nov. 2, 1972

[21] Appl. No.: 303,148

[52] U.S. Cl. ............................................. 91/497
[51] Int. Cl. ......................................... F01b 13/04
[58] Field of Search ............ 91/499, 485, 506, 507, 91/44, 497

[56] References Cited
UNITED STATES PATENTS

| | | | |
|---|---|---|---|
| 3,230,715 | 1/1966 | Klein et al. | 417/310 |
| 3,283,668 | 11/1966 | Louhio | 91/44 |
| 3,289,606 | 12/1966 | Bosch | 91/485 |
| 3,304,885 | 2/1967 | Orth | 91/507 |
| 3,396,536 | 8/1968 | Miller et al. | 91/506 |
| 3,744,377 | 7/1973 | Lauck | 91/499 |

Primary Examiner—William L. Freeh

[57] ABSTRACT

The cylinder barrel bearing face of an axial piston fluid motor is provided with a plurality of generally radially extending grooves whose inner ends are in communication with a source of low-pressure fluid. During periods when the motor is disconnected from a high-pressure source of fluid and the motor is driven mechanically, the grooves operate as a centrifugal pump which pressurizes the crankcase of the motor to hold the pistons off the cam.

9 Claims, 5 Drawing Figures

DESTROKING OF HYDROSTATIC DRIVE MOTORS

BACKGROUND OF THE INVENTION

The present invention relates generally to the art of hydraulics, particularly to fluid translating apparatus and hydrostatic wheel drive systems, and more particularly relates to an improved motor for use in a hydrostatic wheel drive system which is automatically destroked when driven by the wheel.

In order to obtain additional traction, many agricultural and industrial tractors and similar vehicles are provided with an auxiliary hydrostatic drive for the normally nondriven steerable wheels. An example of such an auxiliary hydrostatic drive system is disclosed and claimed in U.S. Pat. No. 3,458,005 which issued on July 29, 1969 to D. I. Malm et al. Such auxiliary hydrostatic drive systems are generally employed only during periods when the load on the vehicle is great and the vehicle is moving at a relatively slow speed. During periods when the vehicle is moving at a relatively high speed, the motor is disconnected from the source of fluid pressure and, during these periods, some precaution must be taken or the motor will be driven by the wheel at such a high speed that the pistons and/or the cam will be damaged and the friction between the cylinder barrel and valve plate will overheat the motor. In the above-noted patent, damage is prevented by disconnecting the motor from the wheel through the use of a pressure responsive clutch. However, the use of the clutch adds considerably to the overall cost of a hydrostatic drive system.

SUMMARY OF THE INVENTION

The principal object of the present invention is to provide an improved motor or pump which, when forced to rotate while disconnected from the source of fluid pressure, will pressurize its drive chamber to push the pistons far enough into the cylinder barrel to avoid damaging contact with the cam or swash plate.

Another important object of the present invention is to provide an improved pump or motor which, when forced to rotate while disconnected from the source of fluid pressure, will circulate fluid through its housing to dissipate the heat created by rotational friction.

Still another important object of the present invention is to provide an improved auxiliary hydrostatic wheel drive system in which the motor cylinder barrel is provided with a plurality of generally radially extending passageways whose outer ends are open to the drive chamber on the motor, whose inner ends are connected to a low-pressure source of fluid, and which function as a centrifugal pump to pressurize the motor drive chamber when the motor is disconnected from the high-pressure source of fluid and is driven by the wheel so that the motor pistons are pushed into the cylinder barrel and damaging contact between the pistons and swash plate is prevented. When the motor is disconnected from the source of high-pressure fluid, its pressure and exhaust ports are both connected to the low-pressure source of fluid and the drive chamber is connected to one of the ports through a check or regulation valve which permits the flow of fluid from the drive chamber to the low-pressure source when the fluid pressure in the drive chamber is slightly greater than the fluid pressure from the low-pressure source of fluid. This circulation of fluid dissipates heat caused by valve plate friction. Another advantage of this construction is that radial passageways in the cylinder barrel operate as a drain line from the drive chamber to the low-pressure source during operation of the motor.

The above objects and additional objects and advantages of the present invention will become apparent to those skilled in the art from a reading of the following detailed description when taken in conjunction with the accompanying drawings.

DESCRIPTION OF THE PREFERRED EMBODIMENT

Figure 1:
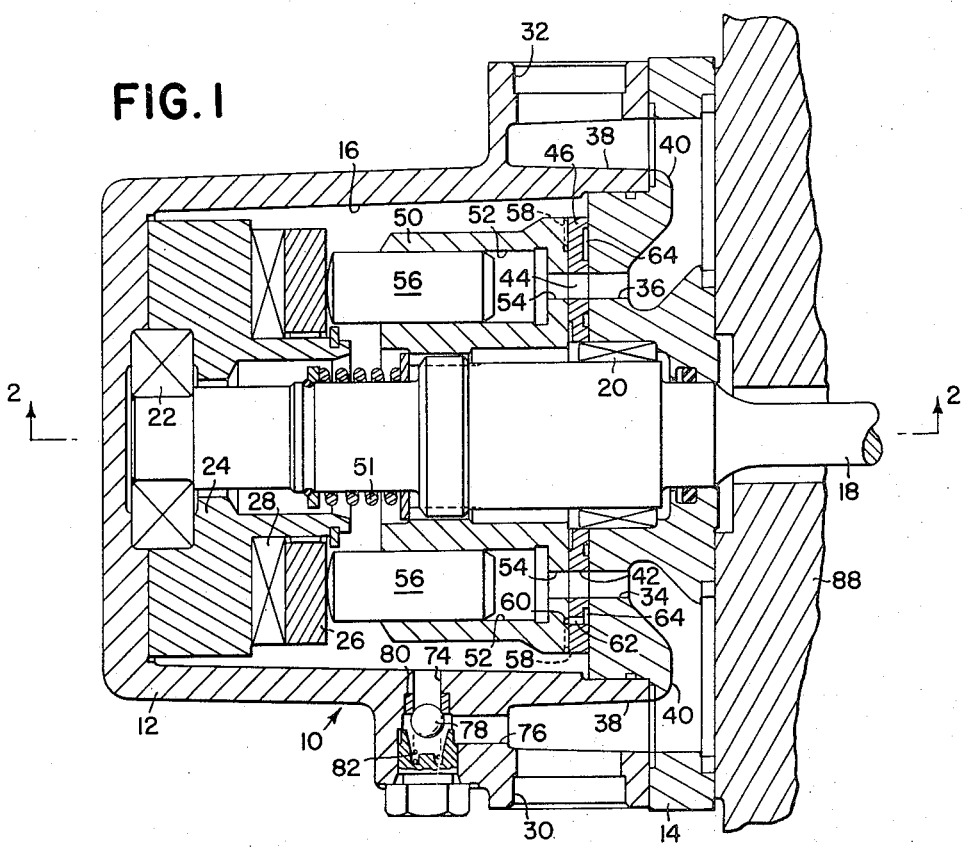
FIG. 1 is a sectional view of the improved hydraulic motor according to the present invention.
Figure 2:
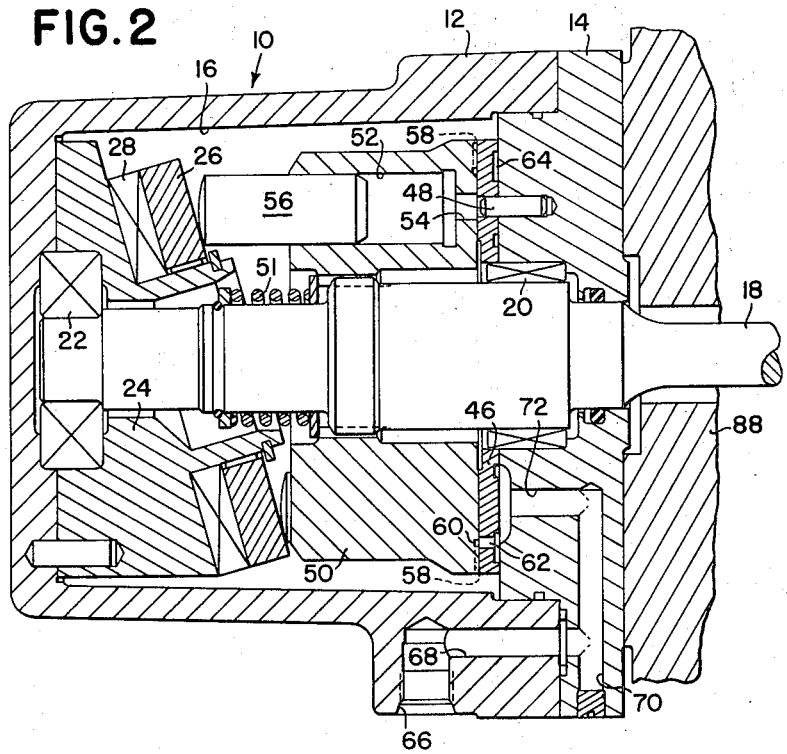
FIG. 2 is a sectional view of the hydraulic motor according to the present invention taken substantially along the line 2—2 of FIG. 1.
Figure 3:
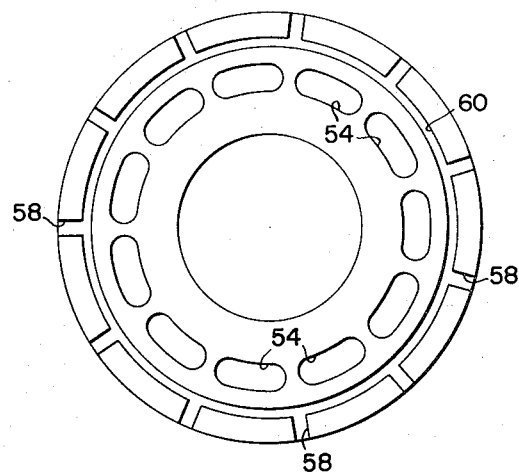
FIG. 3 is an end elevational view of the cylinder barrel bearing face of the pump illustrated in FIGS. 1 and 2.

Referring now to the drawings, a hydraulic motor indicated generally at 10 includes a main casing 12 and an end cap 14 which together constitute a motor housing forming a drive chamber 16. A drive shaft 18 projecting through the end cap 14 is journaled for rotation within the drive chamber by bearings 20 and 22. A swash plate or drive cam 24 is fixed in the extreme end of the drive chamber remote from the end cap 14 and includes a drive ring 26 which is free to move on bearing 28. The main casing 12 is provided with a pair of main ports 30 and 32 which communicate with a pair of ports 34 and 36 provided in the end cap 14 by way of suitable cavities 38 and 40 provided in the main casing 12 and end cap 14. The ports 34 and 36 extend axially through the end cap 14 and communicate with a pair of kidney-shaped ports 42 and 44 provided in a valve plate 46. The valve plate 46 encircles the shaft 18, abuts against the inner face of the end cap 14, and is held in a fixed position with respect to the end plate 14 by one or more pins 48.

A cylinder barrel 50 is mounted on and keyed or splined to the drive shaft 18 for rotation therewith, and has a bearing face held in engagement with an inner bearing face on the valve plate 46 by a spring 51. The cylinder barrel 50 is provided with a plurality of generally axially extending cylinders 52 which are open toward the swash plate and communicate with the ports 42 and 44 in the valve plate 46 by way of cylinder ports 54. A plurality of pistons 56 are reciprocally mounted within the cylinders 52 and normally project therefrom so that their outer ends engage the drive ring 26.

The motor thus far described is of generally conventional structure and will operate in the conventional manner as either a motor or pump. However, according to the preferred embodiment of the present invention, the cylinder barrel 50 is provided with an integral centrifugal pump on the bearing face thereof. The centrifugal pump takes the form of a plurality of radially extending grooves 58 provided in the bearing face of the cylinder barrel 50. The outer ends of the grooves 58 are open to the chamber 16 and the inner ends thereof communicate with an annular groove 60 provided in the bearing face of the cylinder barrel 50. A plurality of apertures 62 extend through the valve plate 46 and communicate with the annular groove 60 and a annular groove 64 provided in the face of the valve plate abutting against the end cap 14. The grooves 64 are in communication with an additional port 66 provided in the main casing 12 by means of bores 68, 70 and 72 provided in the main casing 12 and end cap 14. Although the cylinder barrel is illustrated as having an integral bearing face, those skilled in the art will recognize that a separate bearing plate can be provided on the end of the cylinder barrel, and in this instance, the grooves 58 and 60 could be provided in the bearing plate. Also, the groove 60 could be provided in the valve plate 46 as long as it provides continuous communication between the apertures 62 and grooves 58.

The drive chamber 16 is also in communication with the port 30 by way of bores 74 and 76 provided in the main casing. A check or regulation valve in the form of a ball 78 in the bore 74 which engages a seat 80 prevents the flow of fluid from the port 30 to the chamber 16 by way of the bores 76 and 74. A light spring 82 normally holds the ball 78 against the seat 80 so that fluid cannot flow from the drive chamber 16 to the port 30 until the pressure within the drive chamber 16 is slightly greater than the pressure in the port 30.

Figure 4:
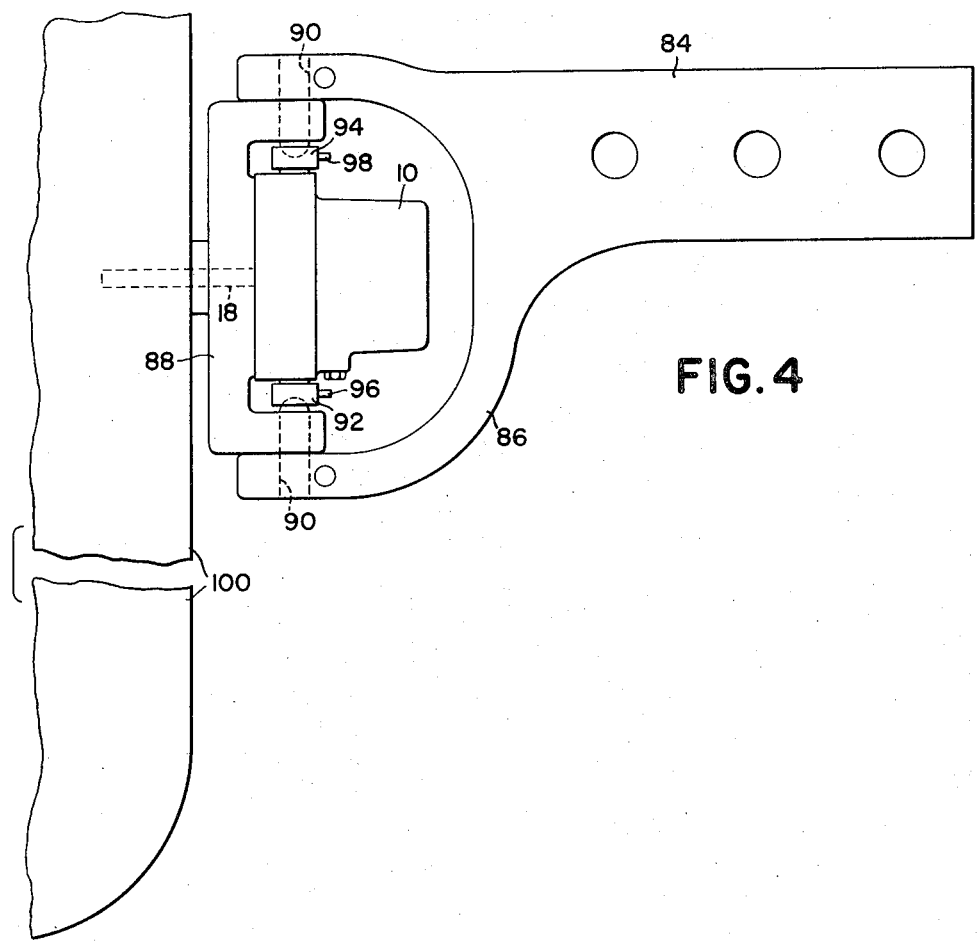
FIG. 4 is a elevational view of the wheel structure of a vehicle illustrating the pump according to the present invention mounted thereon.

As is best illustrated in FIG. 4, the motor 10 is adapted to be mounted on the axle 84 of a motor vehicle. The axle 84 is forked at its outer end 86 and a support member 88 is secured between the legs of the outer forked end of the axle 84 by suitable pins 90. The motor 10 is bolted or otherwise suitably secured to the support member 88 and the drive shaft 18 on the motor 10 extends through the support member 88. Couplers 92 and 94 positioned in the ports 30 and 32 serve to connect the ports 30 and 32 with fluid lines 96 and 98 respectively. The ends of the couplers 92 and 94 are recessed and receive the ends of the pins 90 so that the pins 90 also serve to hold the couplers 92 and 94 within the ports 30 and 32.

A wheel 100 supports the axle 84 through the support member 88 and is connected to the drive shaft 18 of the motor 10 either directly or through suitable reduction gearings such as that illustrated in the above-mentioned U.S. Pat. No. 3,458,005.

Figure 5:
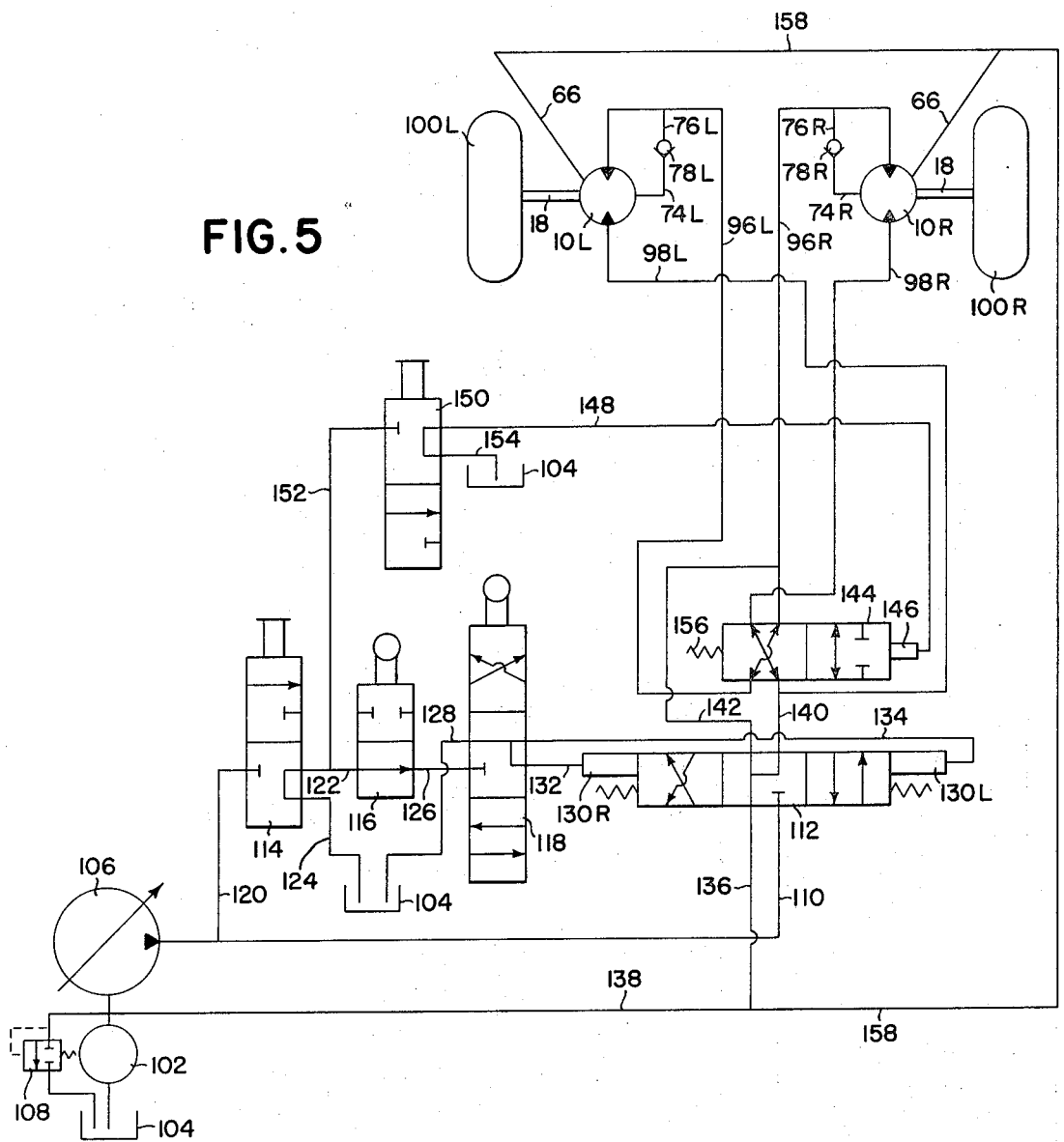
FIG. 5 is a schematic illustration of the entire auxiliary hydrostatic drive system according to the present invention.

Two of the motors, 10L and 10R, would be used on a typical motor vehicle as is illustrated in FIG. 5 which also schematically illustrates the overall hydraulic system of the auxiliary hydrostatic drive system. The hydraulic system includes a charge pump 102 for delivering fluid from a reservoir 104 to a main pump 106. The pressure of the fluid delivered to the pump 106 is limited in any conventional manner such as by a pressure relief valve 108. The main pump 106 delivers fluid at a relatively high pressure thorugh a fluid line 110 to one side of a four-way, three-position, spring-centered, pilot-operated valve 112. The movements of the valve 112 are controlled by a manually actuated on-off valve 114 through a clutch synchronization valve 116 and a transmission synchronization valve 118. One side of the valve 114 is connected to the fluid line 110 by a fluid line 120 and the opposite side of the on-off valve 114 is connected to one side of the clutch synchronization valve 116 through a fluid line 122 and to the reservoir 104 through a fluid line 124. When the valve 114 is in the off position as illustrated, it interconnects the fluid lines 122 and 124, and when in the on position, it connects the fluid line 120 to the first side of the clutch synchronization valve 116.

The second side of the valve 116 is connected to a first side of the transmission synchronization valve 118 by a fluid line 126. The first side of the transmission synchronization valve 118 is also connected to the reservoir 104 by a fluid line 128. The second side of the valve 118 is connected to right- and left-hand actuators 130R and 130L of the valve 112 through fluid lines 132 and 134 respectively.

The valve 116 is linked in any suitable manner to the conventional clutch of the vehicle so that when the clutch is engaged, the valve 116 interconnects the fluid lines 122 and 126 and when the clutch is disengaged, the valve 116 breaks the connection between the fluid lines 122 and 126. The valve 118 is linked in any suitable manner with the conventional mechanical transmission of the vehicle so that when the trasnmission is in a neutral mode, the valve 118 interconnects the fluid lines 128, 132 and 134, when the transmission is in a forward speed ratio mode, the valve 118 interconnects the fluid line 126 with the fluid line 134 and the fluid line 128 with the fluid line 132, and when the transmission is in a reverse gear ratio mode, the valve 118 interconnects the fluid line 126 with the fluid line 132 and the fluid line 128 with the fluid line 134. For examples of how the clutch synchronization valve and the transmission synchronization valve can be linked to the conventional clutch and mechanical transmission of the vehicle, reference can be had to the above-mentioned U.S. Pat. No. 3,458,005 or U.S. Pat. No. 3,552,516 which issued on Jan. 5, 1971 to L. R. Beard et al.

The first side of the valve 112 is also connected to the output of the charge pump 102 through fluid lines 136 and 138, and the second side of the valve 112 is connected to the fluid line 98L through fluid line 140 and to the fluid line 96R through fluid line 142. The fluid line 96R is also connected to one side of a series-parallel valve 144 as is the fluid line 98R. The opposite side of the series-parallel valve 144 is connected to the fluid line 96L and the fluid line 140. The series-parallel valve 144 is normally biased to the parallel position in which it interconnects the fluid line 98R with the fluid lines 140 and 98L and the fluid line 96R with the fluid line 96L and can be moved by an actuator 146 to the series position in which it interconnects the fluid lines 96L and 98R. The actuator 146 is connected by a fluid line 148 to one side of a manually actuated control valve 150. The second side of the control valve 150 is connected to the fluid line 122 by a fluid line 152. When the valve 150 is in the position illustrated, it interconnects the fluid line 148 with the reservoir 104 through a fluid line 154 so that fluid is drained from the actuator 146 and the series-parallel valve 144 is forced to its parallel position by the spring 156. When the valve 150 is moved to its second position, it interconnects the fluid lines 152 and 148 so that when the valve 114 is in the on position, fluid pressure is routed to the actuator 146 to force the series-parallel valve 144 to its series position.

To complete the hydraulic system, the ports 66 of the motors 10L and 10R are connected to the output of the charge pump 102 by fluid lines 158 and 138.

During use of a vehicle having an auxiliary hydrostatic drive system according to the present invention, the operator can selectively employ the auxiliary drive system by moving the manual on-off valve 114 to a position in which it interconnects the fluid lines 120 and 122. The operator also makes a selection as to whether the motors 10L and 10R are to operate in series or parallel by appropriate manipulation of the manual control valve 150. If the vehicle is to be operated in a low gear ratio, the parallel mode of operation would be selected since this will provide a low-speed, high-torque output from the motors 10L and 10R. If the vehicle is to be operated in an intermediate gear ratio, the series mode would be selected since this will provide a higher speed with lower torque output from the motors 10L and 10R. If the vehicle is to be operated in a high gear ratio, the auxiliary drive system would not be employed since the additional traction would not be needed and the auxiliary drive system would only serve as a brake for the vehicle. With the appropriate selections made, the auxiliary drive system will automatically be synchronized with the main drive system since the valve 116 ensures that the motors 10L and 10R are operated only when the clutch is engaged and the main mechanical transmission of the vehicle is in operation and the valve 118 ensures that the motors 10L and 10R are driven in a forward or reverse direction to correspond with the direction of rotation of the main drive wheels. During periods of non-use, the ports 30 and 32 are connected through the fluid lines 96 and 98, the valve 112 and the fluid lines 136 and 138 to the output of the charge pump 102 as is the port 66 of each of the motors 10L and 10R. During this time, the cylinder barrels 50 of the pumps 10 are driven by the wheels 100. At high speeds this can cause considerable heat due to friction between the cylinder barrels and valve plates and can also damage the pistons or drive rings. However, at high speeds, the grooves 58 force fluid into the drive chamber 16. The balls 78 biased by springs 82 retain the fluid within the drive chambers until the pressure within the drive chambers is slightly greater than the pressure within the ports 30 and 32. The pressure within the drive chambers acts against the outer ends of the pistons to force the pistons into the cylinders and away from the drive rings 26. When the pressure within the drive chambers 16 has increased a sufficient amount to unseat the balls 78, fluid will flow through the bores 74 and 76 to the ports 30 and thence through the fluid lines 96, valve 112 back to the fluid lines 138 and 158. This continuous circulation of fluid removes heat from the drive chamber to prevent overheating of the motors.

If the on-off valve 114 is again moved to the on position while the drive is in a series mode or the reverse-parallel mode, the higher pressure acting on the inner ends of the pistons 56 will force the pistons 56 outwardly against the drive ring 26 and the fluid in the drive chamber 16 will be forced through the grooves 58 in the bearing face of the cylinder barrels, the apertures 62, bores 72, 70 and 68, to the fluid line 158. Oil leakage from the motor into the drive chamber 16 during operation of the motor will be returned to the fluid line 158 by way of the same path. If the on-off valve 114 is moved to the on position while the drive is in the forward-parallel mode, the higher pressure acting on the inner ends of the pistons will force the pistons outwardly against the drive ring and the fluid in the drive chamber will be forced out through the check valve 78 and to the fluid line 58 by way of the fluid lines 96 and 142 and valve 112. Oil leakage from the motor into the drive chamber 16 during operation of the motor will be returned to the fluid line 158 by way of the same path.

From the foregoing, it can be seen that the present invention provides a new, improved auxiliary hydrostatic drive system for motor vehicles and an improved motor for use therein which will automatically be destroked and cooled during periods when the motors are disconnected from the high-pressure source of fluid and driven mechanically at a relatively high speed.

Although the invention has been described and illustrated as being applied to a hydraulic motor and particularly as used in a hydrostatic drive system, those skilled in the art will immediately recognize that the invention has equal applicability to a pump. Therefore, in the following claims, motors and pumps will be referred to generically as fluid translating apparatus.

Having thus described one preferred specific embodiment of the invention and suggested another embodiment or use, various changes and modifications within the spirit and scope of the invention will become apparent to those skilled in the art and can be made without departing from the underlying principles of the invention. Therefore, the invention should not be limited to the specific illustration and description of the preferred embodiment but only by the following claims.

We claim:

1. In a fluid translating apparatus of the type including a housing forming a drive chamber, a drive shaft rotatably mounted in the housing and extending from one end thereof, a thrust cam in the chamber in a fixed position with respect to the housing, a cylinder barrel mounted on and keyed to the shaft and having a plurality of pistons reciprocally mounted therein and projecting therefrom into the chamber in driving engagement with the thrust cam, and valving means having inlet and outlet ports fluidly connected to first and second ports in the housing operatively associated with the cylinder barrel to alternately connect each cylinder with the first and second ports in the housing upon rotation of the cylinder barrel; the improvement comprising: a plurality of generally radially extending passageways provided in the cylinder barrel and having outer ends open to the drive chamber; a third port provided in the housing adapted to be connected to a source of fluid; means forming fluid passage means between the third port and inner ends of the passageways; a fourth port in the housing in fluid communication with the drive chamber and adapted to be connected to a source of fluid; and regulation means in the fourth port normally biased to a closed position to prevent flow of fluid through the fourth port until the fluid pressure in the chamber is greater than the pressure on the opposite side of the regulation means by a predetermined amount.

2. In a fluid translating apparatus of the type including a housing forming a chamber, a shaft mounted in the housing for relative rotation with respect thereto and projecting from one end thereof, first and second ports provided in the housing adapted to be connected to high- and low-pressure sources of fluid, a valve member in the chamber in a stationary position with respect to the housing and having a bearing face with inlet and outlet ports in communication with the first and second ports, a cylinder barrel mounted on and keyed to the shaft and having a bearing face complementary to the valve member bearing face, a plurality of cylinders provided in the barrel in communicaton with the bearing face and open to the opposite end, a plurality of pistons reciprocally mounted in the cylinders and projecting from the open ends thereof, and thrust cam means mounted in the chamber in normal driving relation to the projecting ends of the pistons, the improvement comprising: a plurality of generally radially extending passageways having outer ends open to the chamber provided in the bearing face of one of the valve member and cylinder barrel; a third port provided in the housing adapted to be connected to the low-pressure source of fluid; means providing fluid communication between the third port and inner ends of the passageways; a fourth port provided in the housing in fluid communication with the chamber and adapted to be connected to one of the sources of fluid; and regulation means normally biased to a closed position in the fourth port preventing the flow of fluid from the source of fluid through the fourth port to the chamber.

3. A fluid translating apparatus as set forth in claim 2 wherein the means providing fluid communication between the third port and the passageways includes an annular groove provided in one of the bearing faces in communication with the inner ends of the passageways, and fluid passage means provided in the valve member in communication with the groove and third port.

4. A fluid translating apparatus as set forth in claim 3 wherein the fourth port is in communication with one of the first and second ports.

5. In a fluid translating apparatus of the type including a housing forming a drive chamber, a shaft rotatably mounted in the housing and extending from one end thereof, first and second ports provided in the housing adapted to be connected to high- and low-pressure sources of fluid, a valve plate in the chamber in a fixed position with respect to the housing and having inlet and outlet ports in communication with the first and second ports, a cylinder barrel mounted on and keyed to the shaft with one end in abutting relation to the valve plate, the cylinder barrel being provided with a plurality of cylinders open to the end thereof opposite from the valve plate and in fluid communication with the valve plate, a plurality of pistons reciprocally mounted in the cylinders and projecting from the open ends thereof, and thrust cam means mounted in the chamber in a fixed position with respect to the housing and in normally driving relation to the projecting ends of the pistons, the improvement comprising: a plurality of generally radially extending and outwardly open grooves provided in the one end of the cylinder barrel; a third port provided in the housing and adapted to be connected to the low-pressure source of fluid; means forming fluid passage means between the third port and inner ends of grooves; a fourth port provided in the housing in fluid communication with the chamber; and regulation means in the fourth port normally biased to a closed position to prevent fluid flow through the fourth port from the chamber until fluid pressure in the chamber provides a predetermined pressure differential on opposite sides of the regulation means.

6. A fluid translating apparatus as set forth in claim 5 wherein the means forming fluid passage means between the third port and grooves includes an annular groove in one of the cylinder barrel and valve plate in communication with the inner ends of the generally radially extending grooves and an opening provided in the valve plate to interconnect the third port and the annular groove.

7. A fluid translating apparatus as set forth in claim 6 wherein the valve plate is mounted in abutting relation to one end of the housing and is provided with an annular groove on its side in abutting relation to the housing, the third port communicates with the last-mentioned annular groove, and a plurality of apertures extend from the bottom of the last-mentioned groove through the valve plate to the first-mentioned annular groove.

8. A fluid translating apparatus as set forth in claim 7 wherein the first-mentioned annular groove is provided in the one end of the cylinder barrel.

9. A fluid translating apparatus as set forth in claim 8 wherein the fourth port is in communication with one of the first and second ports.

* * * * *